(12) United States Patent
Lee et al.

(10) Patent No.: US 9,336,262 B2
(45) Date of Patent: May 10, 2016

(54) ACCELERATED TRANSACTIONS WITH PRECOMMIT-TIME EARLY LOCK RELEASE

(75) Inventors: Juchang Lee, Anyang-si (KR); Frank Renkes, Rauenberg (DE); Sangyong Hwang, Seoul (KR)

(73) Assignee: SAP SE, Walldorf (DE)

( * ) Notice: Subject to any disclaimer, the term of this patent is extended or adjusted under 35 U.S.C. 154(b) by 634 days.

(21) Appl. No.: 12/898,617

(22) Filed: Oct. 5, 2010

(65) Prior Publication Data

US 2012/0084273 A1 Apr. 5, 2012

(51) Int. Cl.
*G06F 17/00* (2006.01)
*G06F 17/30* (2006.01)

(52) U.S. Cl.
CPC .... *G06F 17/30377* (2013.01); *G06F 17/30351* (2013.01); *G06F 17/30445* (2013.01); *G06F 17/30362* (2013.01)

(58) Field of Classification Search
CPC ................................................. G06F 17/30362
USPC ................................... 707/709, 999.102, 736
See application file for complete search history.

(56) References Cited

U.S. PATENT DOCUMENTS

| | | | | |
|---|---|---|---|---|
| 5,280,612 | A * | 1/1994 | Lorie et al. ........................ | 1/1 |
| 5,845,292 | A * | 12/1998 | Bohannon et al. ................ | 1/1 |
| 5,864,849 | A * | 1/1999 | Bohannon et al. ........... | 707/648 |
| 8,244,719 | B2 * | 8/2012 | Dugan et al. .................. | 707/721 |
| 2003/0208500 | A1 * | 11/2003 | Daynes et al. ............... | 707/100 |
| 2005/0289188 | A1 * | 12/2005 | Nettleton et al. ............ | 707/200 |
| 2006/0059178 | A1 * | 3/2006 | Baron et al. ................. | 707/100 |
| 2006/0122980 | A1 * | 6/2006 | He et al. ........................... | 707/3 |
| 2009/0106248 | A1 * | 4/2009 | Vaghani et al. .................. | 707/8 |
| 2009/0112947 | A1 * | 4/2009 | Bourbonnais et al. ........ | 707/204 |
| 2010/0036831 | A1 * | 2/2010 | Vemuri et al. .................... | 707/5 |
| 2011/0153566 | A1 * | 6/2011 | Larson et al. ................. | 707/638 |

FOREIGN PATENT DOCUMENTS

EP  1498815 A2  1/2005

OTHER PUBLICATIONS

Bohannon, et al., "Distributed multi-level recovery in main-memory databases", Parallel and Distributed Information Systems, Fourth International Conference, Dec. 18, 1996.

Mohan, et al., "ARIES: A Transaction Recovery Method Supporting Fine-Granularity Locking and Partial Rollbacks Using Write-Ahead Logging", ACM Transactions on Database Systems, vol. 17, No. 1, Mar. 1992.

* cited by examiner

*Primary Examiner* — Eliyah S Harper
(74) *Attorney, Agent, or Firm* — Mintz Levin Cohn Ferris Glovsky and Popeo, P.C.

(57) ABSTRACT

A system, method and computer product for accelerating parallel database transactions. One or more data processors execute a first transaction on a database. The first transaction includes a transactional lock associated with each of one or more records to update the one or more records during the first transaction, and a pre-commit command to request acknowledgement of committing the updating of the one or more records during the first transaction. The one or more data processors execute a second transaction on the database in parallel with the first transaction. The second transaction includes a transactional lock associated with each of one or more records to update the one or more records during the second transaction, and a pre-commit command to request acknowledgement of committing the updating of the one or more records during the second transaction. The transactional locks of the first and second transactions are released before flushing log records associated with the first and second transactions.

11 Claims, 4 Drawing Sheets

ACCELERATED TRANSACTIONS WITH PRECOMMIT-TIME EARLY LOCK RELEASE

BACKGROUND

This disclosure relates generally to database management systems, and more particularly to accelerated transactions with precommit-time early lock release of log files of a database.

To ensure isolation of transactions with a database, most traditional database management systems (DBMS) implement two-phase locking, in which the locks acquired via a transaction are held until the transaction commits or aborts. As shown in FIG. 1, convention early lock release proposals are based on a sequential logging architecture which has only a single log volume, and some techniques employ a precommit-time lock release scheme for parallel logging architecture. However, such schemes have to keep track of dependency among all the running update transactions and require a kind of two-phase commit (2PC) commit protocol, where a transaction end log record is written to the log disk after waiting until the transaction end log records of its dependent precommitted transactions are flushed. Some existing early lock release techniques typically employ a sequential logging architecture with a single volume. However, all of these techniques incur substantial overhead and require substantial inter-transaction dependency management.

A common logger can maintain a single log file for separate data processing engines, but in some cases, it may be desirable for a logger to maintain separate log volumes for each engine. For example, for two engines A and B, it may be desirable to maintain separate volumes of a log, such that when a transaction updates both table A and table B, of engine A and engine B respectively, one part of the log is assigned to an A log file and another part is assigned to a B log file.

However, in such a scenario, the transaction cannot commit until there is a synchronous log flush to both the A log file and B log file, which can be resource intensive, time-consuming, and prone to logging errors.

SUMMARY

In general, this document discloses a pre-commit time early lock release (PTELR) system and method using a parallel architecture, in which transactional locks are released before flushing log records to reduce wait time at hot spot data, reduce response time of transactions, and increase throughput of a database and DBMS.

Contrasted with existing precommit-time lock release schemes, the PTELR protocol enables a precommit-time lock release under parallel logging architecture with efficient inter-transaction dependency management scheme. The PTELR protocol is more efficient than conventional techniques in that it does not incur two-phase locking-style commit overhead, and simplifies the inter-transaction dependency management by using so-called 'commit-dependent LSNs'.

Specifically, this document discloses a technique for synchronous log flush to multiple log files. In one aspect, a method for accelerating parallel database transactions includes the step of executing, by one or more data processors, a first transaction on a database. The first transaction includes a transactional lock associated with each of one or more records to update the one or more records during the first transaction, and a pre-commit command to request acknowledgement of committing the updating of the one or more records during the first transaction. The method further includes a step of executing, by the one or more data processors, a second transaction on the database in parallel with the first transaction. The second transaction includes a transactional lock associated with each of one or more records to update the one or more records during the second transaction, and a pre-commit command to request acknowledgement of committing the updating of the one or more records during the second transaction. The method further includes a step of releasing the transactional locks of the first and second transactions before flushing log records associated with the first and second transactions.

In another aspect, a method for accelerating parallel database transactions includes receiving, by one or more data processors, a request from a client network to execute a first transaction on a database, and executing, by one or more data processors, the first transaction on a database. The first transaction includes a transactional lock associated with each of one or more records to update the one or more records during the first transaction, and a pre-commit command to request acknowledgement of committing the updating of the one or more records during the first transaction. The method further includes receiving, by the one or more data processors, a request from the client network to execute a second transaction on the database in parallel with the first transaction, and executing, by the one or more data processors, a second transaction on the database in parallel with the first transaction. The second transaction includes a transactional lock associated with each of one or more records to update the one or more records during the second transaction, and a pre-commit command to request acknowledgement of committing the updating of the one or more records during the second transaction. The method further includes releasing the transactional locks of the first and second transactions before flushing log records associated with the first and second transactions.

In yet another aspect, a computer program product for accelerating parallel database transactions is presented. The product comprises a storage medium readable by at least one processor and storing instructions for execution by the at least one processor for executing the methods described herein.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

This document describes a pre-commit early lock release system and method using a parallel architecture, in which transactional locks are released before flushing log records.

Figure 1:
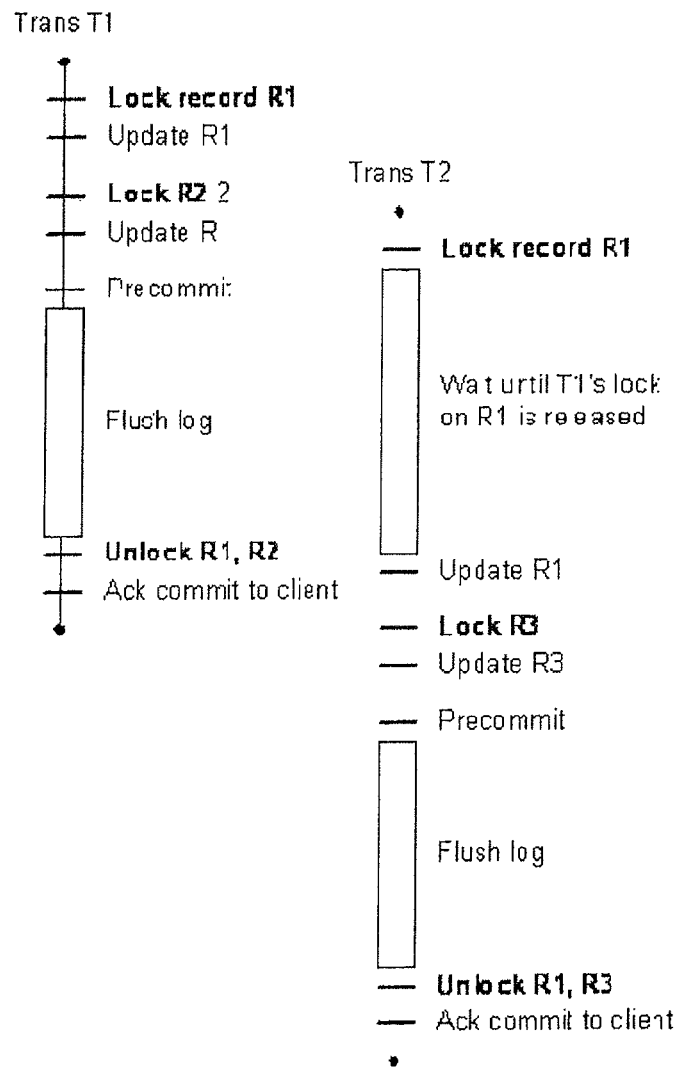
FIG. 1 illustrates a conventional early lock release scheme.
Figure 2:
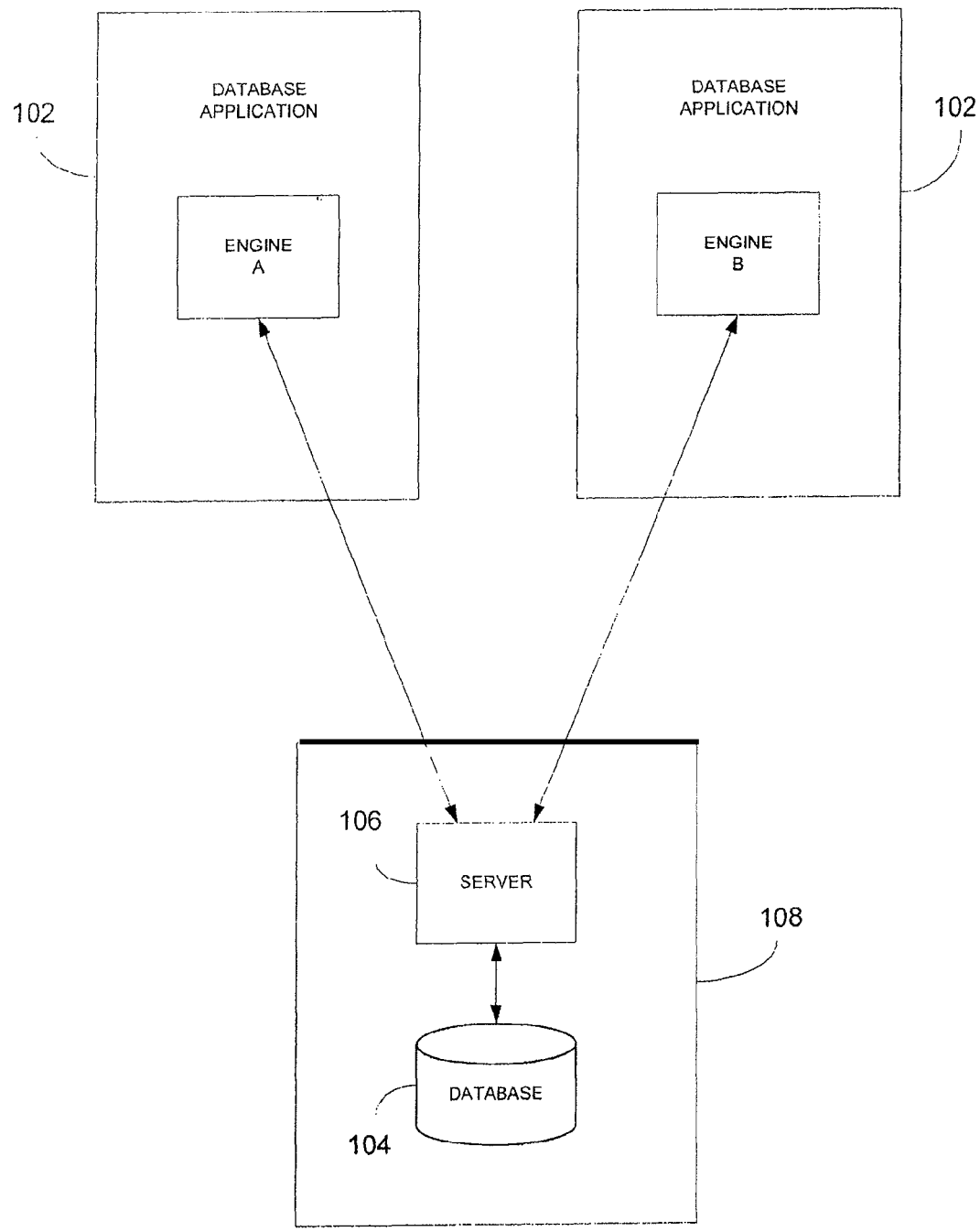
FIG. 2 illustrates a computing system with accelerated transactions using pre-commit time early lock release.

FIG. 2 shows a computing system 100 in which two separate computing engines of one or more database applications 102, engine A and engine B, that transact with a database 104 connected with a server 106 of a server system 108. Engine A and engine B maintain separate log volumes, such that when a transaction updates, both table A and table B, of engine A and engine B respectively, one part of the log is assigned to an A log file and another part is assigned to a B log file.

Figure 3:
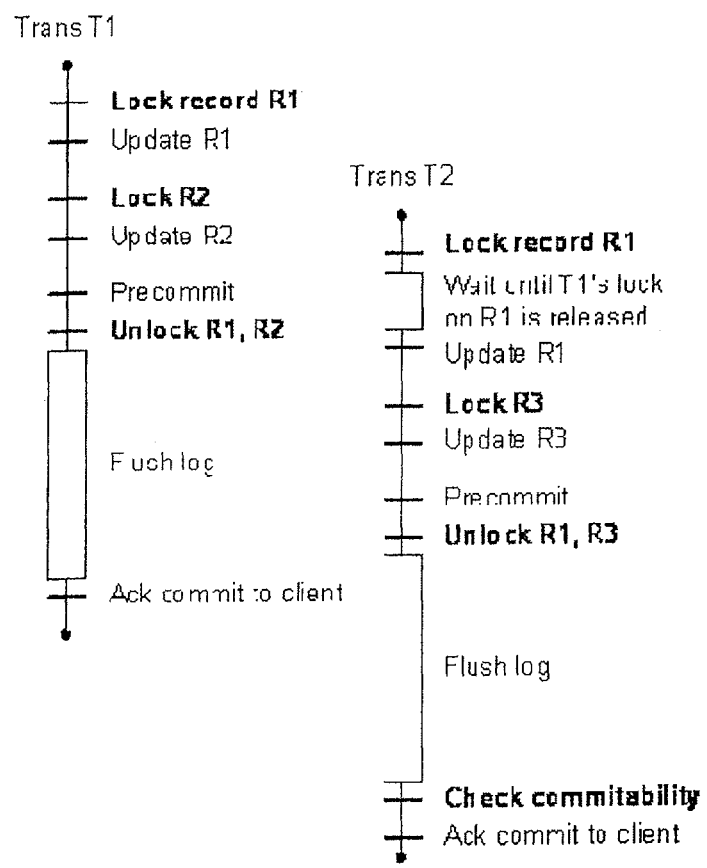
FIG. 3 illustrates a pre-commit time early lock release method.

FIG. 3 illustrates a PTELR method in accordance with some implementations. As compared with traditional strict or rigorous two-phase locking, the PTELR method releases transactional locks before flushing log records, thereby reducing lock wait time at hot spot data (e.g. record R1 of Transaction 2). This leads to shorter response time and higher throughput of database transactions.

The pre-commit time early release protocol represents the commit log sequence number (LSN) as a vector, and the transaction commit is automatically decided by the LSN-based commit-dependency check logic. The commit-dependent LSNs for each transaction are stored in its transaction end log record. During recovery, whenever a transaction end log record is encountered, its commit is checked by comparing the commit-dependent LSNs with tail LSNs. Normally, the lock items required by a transaction are released at pre-commit time, and its commit is decided when the commit-dependent LSNs become larger than the current tail LSNs.

The commit-dependent LSNs for a transaction are maintained with the help of a lock table and a transaction token. The lock table is preferably a hash table of lock items, and may be maintained to associate time slots with their lock information. In this case, for each lock item, a "previous writer transaction" field is added to each lock item to point to the update transaction that previously acquired the lock item exclusively. This field is set when its exclusive-lock holder transaction precommits, and is reset when it commits.

The transaction token keeps runtime context information of a transaction. In the transaction token, the commit-dependent LSNs of the transaction are added. These are set when the transaction precommits by reading the "previous writer transaction" fields of the lock items that the transaction has acquired. These commit-dependent LSNs are used to decide to commit a transaction after its log flush during runtime.

Early lock release can be integrated with multi-version concurrency control (MVCC). For early lock release, two commit timestamps are assigned to each update version. One commit timestamp is assigned at transaction precommit time, i.e. before log flush, and another is assigned at transaction postcommit time, i.e. after log flush. When reading a version, if only the first precommit timestamp is assigned to the version, its commit dependency is checked by comparing the version's commit-dependent LSNs with the current tail LSNs.

Figure 4:
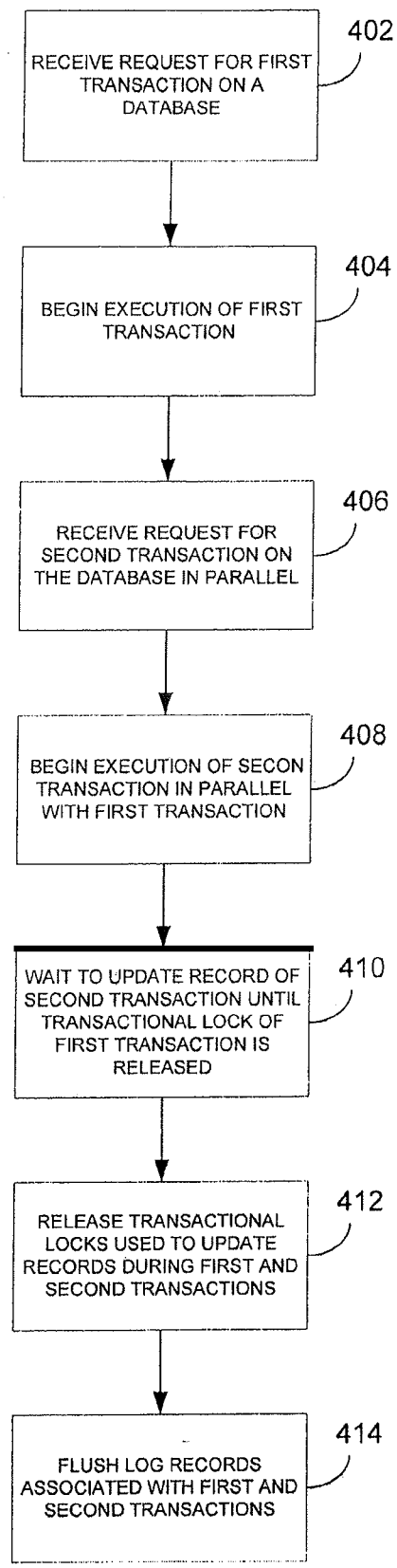
FIG. 4 is a flowchart of a method for accelerating parallel database transactions in a data processing system.

FIG. 4 is a flowchart of a method 400 for accelerating parallel database transactions in a data processing system. At 402, a data processing system receives a request for a first transaction on a database that is part of the data processing system. At 404, the data processing system begins execution of the first transaction. At 406, the data processing system receives a request for a second transaction on the database, to be executed in parallel (i.e. concurrently, but not necessarily at exactly the same time). At 408, the data processing system begins execution of the second transaction. It should be noted that the method 400 and the systems and techniques described herein are applicable to more than two parallel database transactions, and such methods, systems and techniques are equally applicable to three or more database transactions being executed in parallel.

Each transaction includes a transactional lock associated with each of one or more records. The transactional lock is used to update the one or more records during the relevant transaction. Each transaction further includes, for each record update, a pre-commit command to request acknowledgement of committing the updating of the record during the transaction. Thus, at 410, the data processing system waits to update a record of the second transaction until a transactional lock of the first transaction, i.e. the transaction in which records are being updated earlier in time, is released.

At 412, the data processing system releases any final transactional locks used to update records during the first and second transactions, and at 414, the log records being kept by the data processing system and associated with the first and second transactions are flushed by the data processing system. Consequently, by releasing the transactional locks before the log records are flushed, the data processing system avoids significant wait times, and an acknowledgement of each committed record update can be sent by the data processing system to the client computer associated with each transaction request.

Some or all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

The invention claimed is:

1. A method for accelerating parallel database transactions, the method comprising:
   executing, by one or more data processors, a first transaction on a database, the first transaction including a transactional lock for each of one or more records to update the one or more records during the first transaction, and a pre-commit command to request acknowledgement of committing the updating of the one or more records during the first transaction;
   executing, by the one or more data processors, a second transaction on the database in parallel with the first transaction, the second transaction including a transactional lock for each of one or more records to update the one or more records during the second transaction, and a pre-commit command to request acknowledgement of committing the updating of the one or more records during the second transaction;
   waiting, by the one or more data processors, to execute an update of a record during the second transaction until a transactional lock of the first transaction is released; and
   releasing the transactional locks of the first and second transactions before flushing log records for the first and second transactions;
   wherein each pre-commit command for the first transaction and the second transaction is automatically generated based on a commit-dependent log sequence number (LSN);
   wherein each version of an update to the one or more records is assigned a precommit timestamp at transaction precommit time and a postcommit timestamp at transaction postcommit time and a commit dependency of each version of the update to the one or more records is checked based on the assigned precommit timestamp when the commit-dependent LSN becomes larger than a current tail LSN;
   wherein each LSN is associated with a lock table that associates time slots with lock information, and a transaction token that stores runtime context information of a transaction.

2. The method in accordance with claim 1, further comprising:
   receiving, by the one or more processors, a request to execute the first transaction from a client computer.

3. The method in accordance with claim 2, further comprising:
   sending, by the one or more processors, an acknowledgement of updating the one or more records to commit execution of the first transaction.

4. The method in accordance with claim 2, further comprising:
receiving, by the one or more processors, a second request to execute the second transaction from a second client computer.

5. A method for accelerating parallel database transactions, the method comprising:
receiving, by one or more data processors, a request from a client network to execute a first transaction on a database;
executing, by one or more data processors, the first transaction on a database, the first transaction including a transactional lock for each of one or more records to update the one or more records during the first transaction, and a pre-commit command to request acknowledgement of committing the updating of the one or more records during the first transaction;
receiving, by the one or more data processors, a request from the client network to execute a second transaction on the database in parallel with the first transaction;
executing, by the one or more data processors, a second transaction on the database in parallel with the first transaction, the second transaction including a transactional for each of one or more records to update the one or more records during the second transaction, and a pre-commit command to request acknowledgement of committing the updating of the one or more records during the second transaction;
waiting, by the one or more data processors, to execute an update of a record during the second transaction until a transactional lock of the first transaction is released; and
releasing the transactional locks of the first and second transactions before flushing log records for the first and second transactions;
wherein each pre-commit command for the first transaction and the second transaction is automatically generated based on a commit-dependent log sequence number (LSN);
wherein each version of an update to the one or more records is assigned a precommit timestamp at transaction precommit time and a postcommit timestamp at transaction postcommit time and a commit dependency of each version of the update to the one or more records is checked based on the assigned precommit timestamp when the commit-dependent LSN becomes larger than a current tail LSN;
wherein each LSN is associated with a lock table that associates time slots with lock information, and a transaction token that stores runtime context information of a transaction.

6. The method in accordance with claim 5, further comprising sending, by the one or more processors, an acknowledgement of updating the one or more records to commit execution of the first transaction.

7. A non-transitory computer program product for accelerating parallel database transactions, the product comprising a storage medium readable by at least one processor and storing instructions for execution by the at least one processor for:
executing, by one or more data processors, a first transaction on a database, the first transaction including a transactional lock for each of one or more records to update the one or more records during the first transaction, and a pre-commit command to request acknowledgement of committing the updating of the one or more records during the first transaction;
executing, by the one or more data processors, a second transaction on the database in parallel with the first transaction, the second transaction including a transactional lock for each of one or more records to update the one or more records during the second transaction, and a pre-commit command to request acknowledgement of committing the updating of the one or more records during the second transaction;
waiting, by the one or more data processors, to execute an update of a record during the second transaction until a transactional lock of the first transaction is released; and
releasing the transactional locks of the first and second transactions before flushing log records for the first and second transactions;
wherein each pre-commit command for the first transaction and the second transaction is automatically generated based on a commit-dependent log sequence number (LSN);
wherein each version of an update to the one or more records is assigned a precommit timestamp at transaction precommit time and a postcommit timestamp at transaction postcommit time and a commit dependency of each version of the update to the one or more records is checked based on the assigned precommit timestamp when the commit-dependent LSN becomes larger than a current tail LSN;
wherein each LSN is associated with a lock table that associates time slots with lock information, and a transaction token that stores runtime context information of a transaction.

8. The computer program product in accordance with claim 7, wherein instructions for execution by the at least one processor further comprises:
receiving, by the one or more processors, a request to execute the first transaction from a client computer.

9. The computer program product in accordance with claim 8, wherein instructions for execution by the at least one processor further comprises:
sending, by the one or more processors, an acknowledgement of updating the one or more records to commit execution of the first transaction.

10. The computer program product in accordance with claim 8, wherein instructions for execution by the at least one processor further comprises:
receiving, by the one or more processors, a second request to execute the second transaction from a second client computer.

11. The computer program product in accordance with claim 7, wherein each LSN is further associated with a transaction token that keeps runtime context information of each of the first transaction and the second transaction.

* * * * *